United States Patent [19]

Potts et al.

[11] Patent Number: 4,691,564
[45] Date of Patent: Sep. 8, 1987

[54] HIGH SPEED TIRE UNIFORMITY TESTING DEVICE

[75] Inventors: Gerald R. Potts, Flint, Mich.; John C. Ryder, Massillon, Ohio

[73] Assignee: G. R. Potts Associates, Inc., Flint, Mich.

[21] Appl. No.: 880,759

[22] Filed: Jul. 1, 1986

[51] Int. Cl.$^4$ .......................................... G01M 17/02
[52] U.S. Cl. ................................................ 73/146
[58] Field of Search ...................................... 73/146, 8

[56] References Cited

U.S. PATENT DOCUMENTS

| | | |
|---|---|---|
| 2,920,481 | 1/1960 | Hulswit, Jr. et al. ............... 73/146 |
| 3,797,306 | 3/1974 | Petersen et al. ...................... 73/146 |
| 3,948,080 | 4/1976 | Boyd ...................................... 73/146 |
| 3,982,430 | 9/1976 | Pommellet et al. .................. 73/146 |
| 4,475,383 | 10/1984 | Fischer et al. ....................... 73/146 |
| 4,499,759 | 2/1985 | Hull ....................................... 73/146 |

*Primary Examiner*—Donald O. Woodiel
*Attorney, Agent, or Firm*—Cullen, Sloman, Cantor, Grauer, Scott & Rutherford

[57] ABSTRACT

A high speed tire uniformity testing device which is constructed to prevent mechanical resonances in the tire load frame during high frequency testing, thereby permitting undistorted measurements of higher harmonic force variation signals from the tire. A test tire is mounted to a rotatable spindle within a housing for selective engagement with a road wheel. The housing is supported and maneuvered by a plurality of vertical and horizontal members, each member including universal joints at its opposite ends to prevent bending moments from being applied to the members. Since only tension and compression forces are applied to the members, a very stiff load frame is provided for the test tire. One of the members comprises a linear actuator which is spaced substantially away from the longitudinal axis of the housing to provide additional stability to the housing during testing. Load cells are connected to the members for the purpose of measuring the tension or compression variations due to the rolling engagement between the test tire and road wheel.

4 Claims, 4 Drawing Figures

HIGH SPEED TIRE UNIFORMITY TESTING DEVICE

BACKGROUND OF THE INVENTION

The present invention relates to a high speed tire uniformity testing device which is constructed for maximum stiffness and minimum mass for producing high resonant frequencies thereby assuring that no mechanical resonances exist within the measurement frequency range.

In the prior art, there are a number of tire testing machines of various kinds such as shown in U.S. Pat. Nos. 3,060,734, 3,206,973, 3,543,576, 3,546,936, 3,604,245 and 3,797,306. These devices typically include large frames that are required for moving the tire into position against a testing wheel. Such cumbersome mechanisms increase the cost of construction and make installation and servicing difficult. None of these devices provide an efficient, relatively lightweight and accurate tire testing apparatus that can be easily instrumented to provide for an analysis of all of the required loads and movements necessary for tire compliance testing.

Tire uniformity measurements are primarily associated with an assessment of the radial, fore/aft, and lateral force variations to be expected at the center of a tire rolling at a constant loaded radius. The need for tire uniformity measurements arose from the fact that the tire can be an exciter of vehicle vibrations. Previously, this sensitivity was mostly related to the first harmonic of the tire's non-uniformity. This first harmonic sensitivity feels very much like tire unbalance, having a once per tire revolution excitation rate.

The force variation signals from a tire can be decomposed into a series of sinusoidal components wherein the component having one cyclic variation per tire revolution being called the first harmonic, that with two complete cycles per tire revolution being called the second harmonic, etc. When one of these harmonics excites a resonant mode of vehicle vibration, a noticeable disturbance may be felt inside the vehicle. Since the first harmonic force typically has the largest peak-to-peak amplitude, that harmonic is usually the most noticeable. However, the higher harmonics become noticeable in the form of beating together, i.e., interfering and reinforcing one another. Nevertheless, typical tire uniformity measurements in the prior art have only included the first harmonic peak-to-peak values for the radial and lateral force variation signals from the tire since it was believed that low speed measurement of these quantities provided the necessary correlation to ride comfort ratings.

With the ever-increasing use of radial tires, which have lower resonant frequencies than bias ply tires, it has become important to measure higher harmonic excitations because of the disturbances caused by these higher harmonics. A problem exists, however, because prior devices are not able to readily assess the disturbances produced by the higher harmonics. Moreover, the smaller and lighter vehicles being produced today with unibody construction are generally more sensitive to these higher harmonics, thereby producing an even greater need for such measurements.

Therefore, it is a principal object of the present invention to provide a high speed tire uniformity testing device which will not resonate within the test frequency range of approximately 1-200 Hz that is required for measuring higher tire harmonics. It is preferred that the device include a very stiff but lightweight load frame so that all resonances therein are above 200 Hz with the load frame being easy to install, relocate and maintain.

SUMMARY OF THE INVENTION

The present invention provides a high speed tire uniformity testing machine which is constructed such that no mechanical resonances exist within the measurement frequency range of approximately 1-200 Hz, thereby permitting the measurement of both higher harmonic excitation rates and increased fore/aft non-uniformity forces that increase with tire speed. The device permits the movement of a test tire against a road wheel in a relationship for accurate testing. Suitable controls can be provided to adequately control and instrument the tire testing device.

The main support base for the device includes opposed vertical frames for rotatably supporting an axle of a road wheel. The road wheel is driven by a drive motor which is operatively connected thereto. A test tire is mounted to a rotable spindle on a housing for selective engagement with the road wheel. The housing is supported by a plurality of vertical tie rods and horizontal tie rods with each tie rod including universal joints at its opposite ends. The test tire is drawn against or disengaged from the road wheel by means of a linear actuator which is connected to the housing by yet another universal joint.

The axis of the linear actuator is spaced substantially above the main longitudinal axis of the housing to provide the necessary stability to the housing during testing. Load cells are connected to the tie rods and actuator for the purpose of measuring tension or compression variations along the connecting links to the housing due to the rolling engagement between the test tire and road wheel. Significantly, the tie rods provide for maximum stiffness when the tire is rotatably engaged against the road wheel because the universal joint connections prevent the application of bending moments to the tie rods, and therefore, only tension and compression forces are applied. Since such members are strongest in tension or compression, they provide maximum stiffness while requiring the least amount of mass. Thus, the very stiff load frame assures that no mechanical resonances will exist within the intended test frequency range of approximately 1-200 Hz, thereby permitting undistorted measurements of higher harmonics in the test tire.

DETAILED DESCRIPTION OF THE INVENTION

Figure 1:
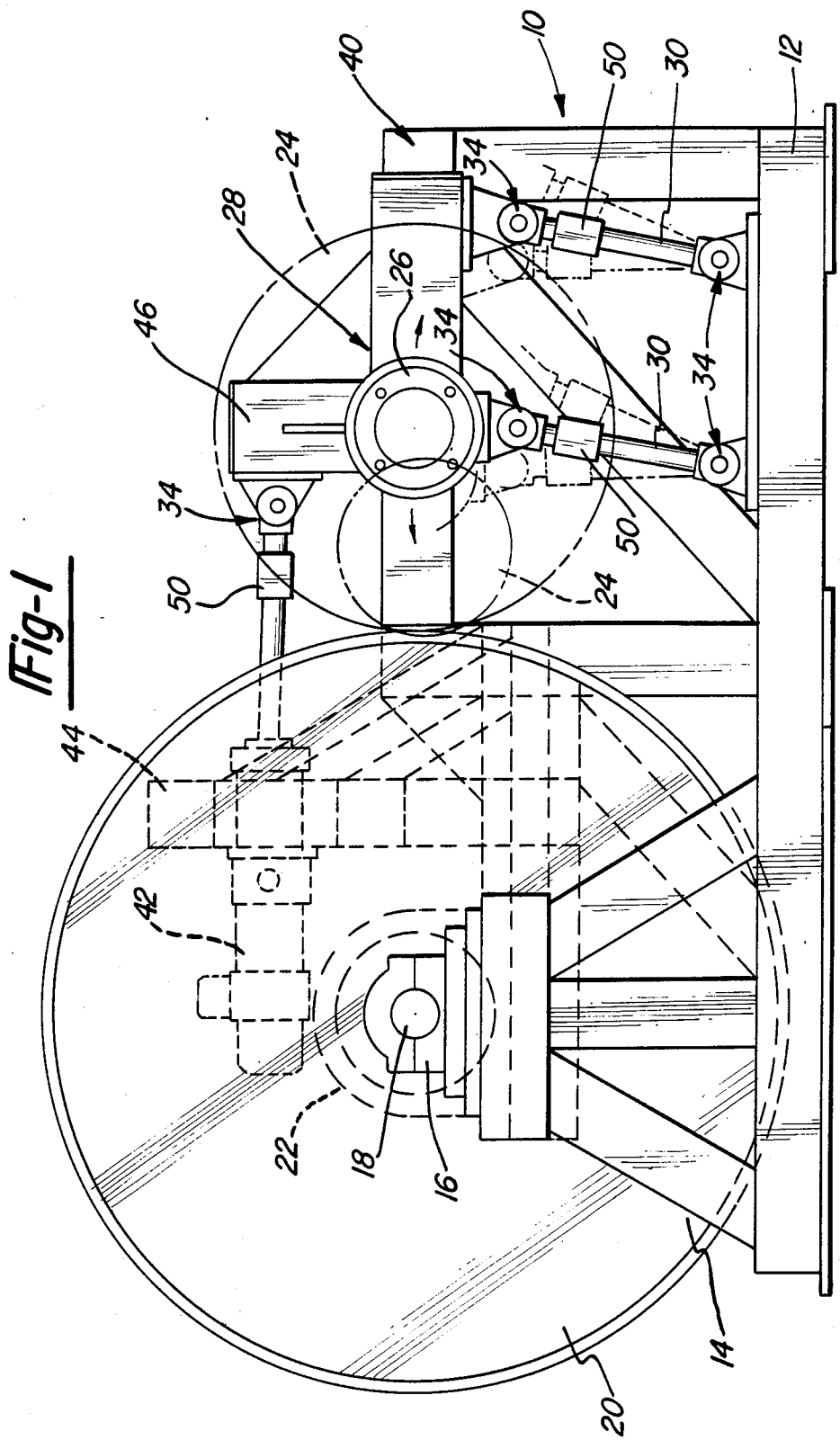
FIG. 1 is a side elevational view of the high speed tire uniformity testing device of the present invention.
Figure 2:
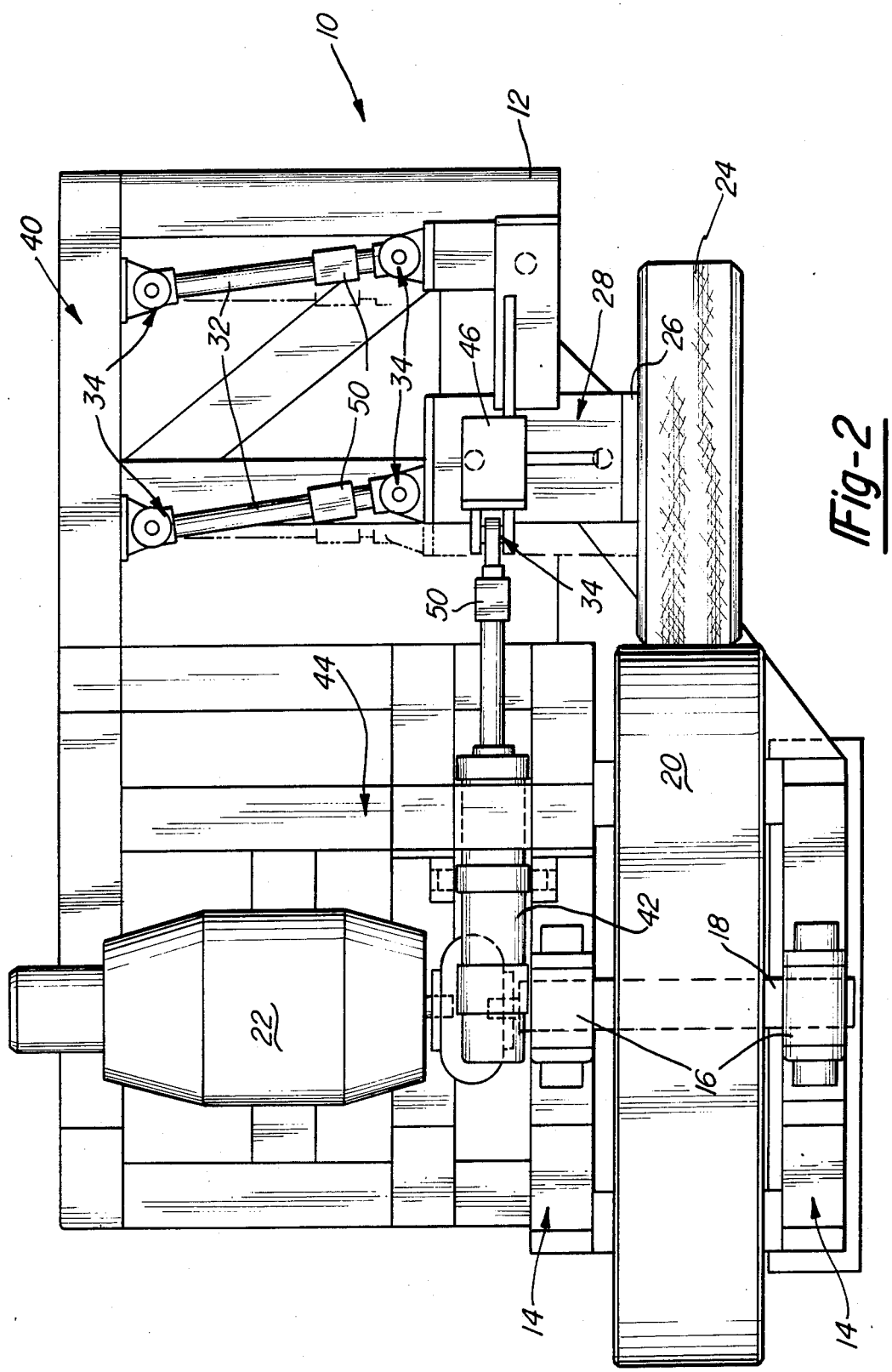
FIG. 2 is a top plan view of the tire uniformity testing device.
Figure 4:
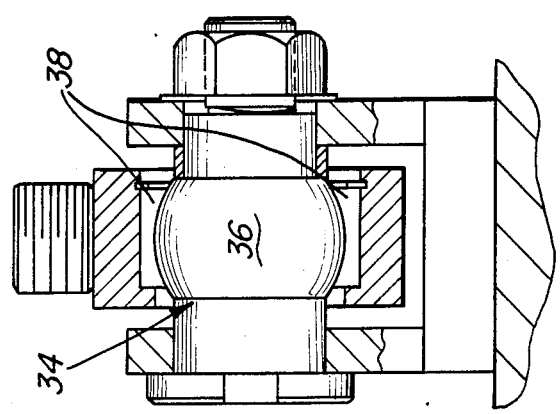
FIG. 4 is a partial cross section illustrating a typical universal joint which forms part of the present invention.
Figure 3:
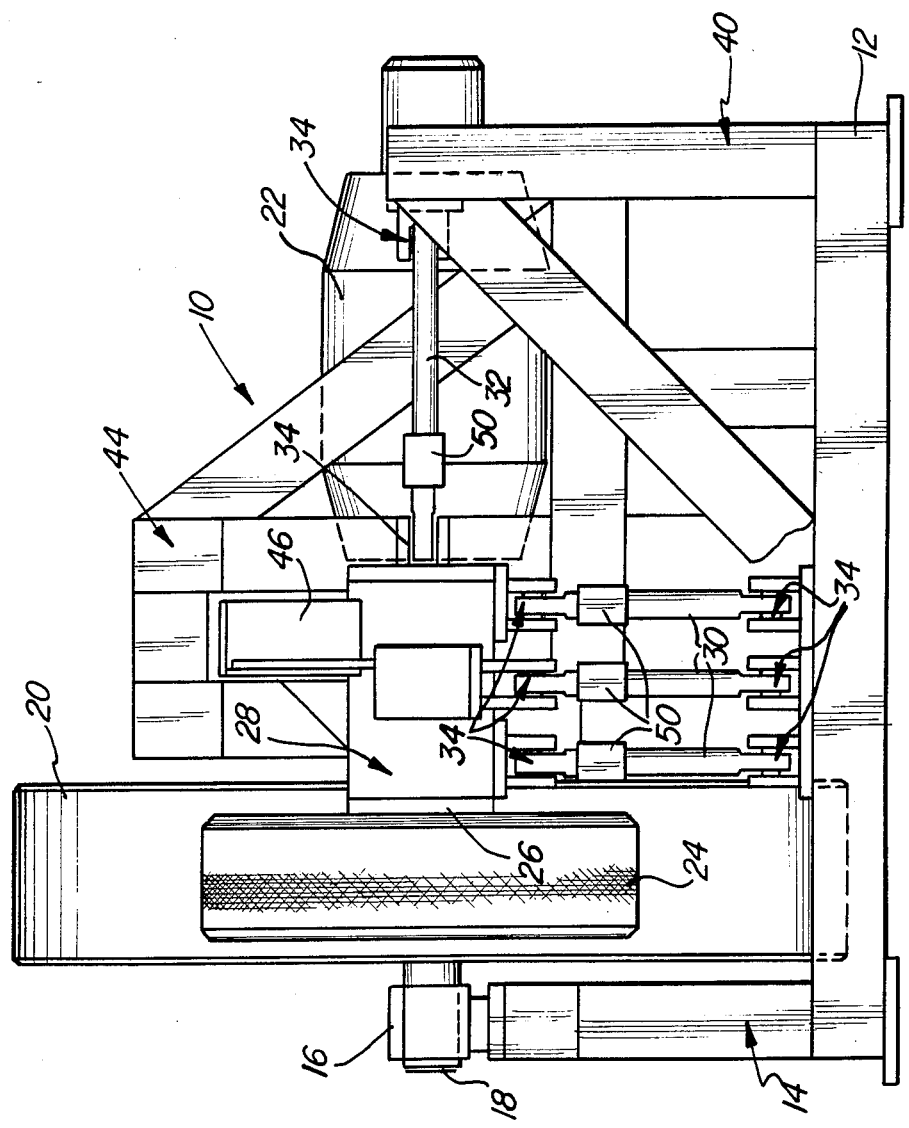
FIG. 3 is an end view of the tire uniformity testing device.

A high speed tire uniformity testing machine 10 made in accordance with the principles of the present invention is disclosed in FIGS. 1-4. A main support base 12 includes opposed vertical support frame 14 having bushings 16 on their upper ends for rotatably supporting an axle 18 for a road wheel 20. The road wheel 20 is driven by a drive motor 22 which is operatively connected to axle 18.

A test tire 24 is mounted to a rotatable spindle 26 within housing 28 for selective engagement with road wheel 20. Housing 28 is supported by a plurality of vertical tie rods 30 and horizontal tie rods 32. The tie rods 30 and 32 include universal joints 34 at their opposite ends, each comprising ball bearing members 36 and 38 as is typically shown in FIG. 4. Each of the vertical tie rods 30 is connected by the universal joints 34 between the underside of housing 28 and main support base 12. Each of the horizontal tie rods 32 is connected by the universal joints 34 between a side of housing 28 and vertical support structure 40 extending upwardly from support base 12.

Test tire 24 is drawn against or disengaged from road wheel 20 by means of a linear actuator 42 that is mounted to support structure 44 at its cylinder end. Actuator 42 is connected at its piston end to a vertically protruding portion 46 of housing 28 by yet another universal joint 34. The axis of linear actuator 42 is spaced substantially above the main longitudinal axis of housing 28, which is generally coincident with the rotational axis of road wheel 20, to provide the necessary stability to housing 28 during its movement toward and away from road wheel 20. FIG. 1 illustrates in phantom lines the maximum and minimum diameters for test tire 20 that can be mounted to housing 28 and drawn against or disengaged from road wheel 20 by actuator 42.

A plurality of load cells 50 are connected along the lengths of tie rods 30 and 32 and the piston end of actuator 42 for the purpose of measuring tension or compression variations along the connecting links, i.e., 30, 32 and 42, between frame 12 and housing 28 due to the rolling engagement between test tire 24 and road wheel 20. Significantly, the tie rods 30 and 32 provide for maximum stiffness when tire 24 is rotatably engaged against road wheel 20 because of the universal joint connections 34 which prevent bending moments from being applied to the tie rods, and therefore, only tension and compression forces are applied to the tie rods. Since the tie rods are strongest in tension or compression, they provide maximum stiffness against loads applied to housing 28 while requiring the least amount of mass.

Thus, a very stiff load frame is provided for test tire 24 to prevent mechanical resonances in the frame members for test frequency ranges lower than 200 Hz. This permits testing of tires at higher speeds which produce higher harmonics of radian, lateral, and fore/aft non-uniformity forces in the tire.

We claim:

1. An apparatus for testing tires at high speed comprising:
   a rotatable wheel mounted on an axle, means for supporting said wheel on a frame, and means operatively connected to said axle for driving said wheel;
   a tire mounting means connected to a housing for rotatably mounting a test tire and a linear actuator connected to said housing by means of a universal joint for moving said housing and test tire toward and away from said wheel;
   said housing connected to said frame by means of first and second tie rod members with said first tie rod member being connected between the frame and the underside of said housing and said second tie rod member being connected between the frame and a side of said housing wherein the angle formed between the axes of said first and second members being substantially 90 degrees; and
   said tie rod members connected to said housing and said frame by means of universal joints whereby only tension and compression forces are applied to said members when said test tire is rotatably engaged against said wheel.

2. The apparatus as defined in claim 1 including a plurality of first tie rod members and a plurality of second tie rod members with said first tie rod members forming four bar linkage connections between said frame and the underside of said housing and said second tie rod members forming four bar linkage connections between the frame and the side of said housing.

3. The apparatus as defined in claim 1 wherein each of said tie rod members and said actuator including load cells positioned for measuring tension or compression variations in response to rolling engagement between the test tire and wheel.

4. The apparatus as defined in claim 1 wherein the axis of said linear actuator being spaced substantially away from the axis of said housing to provide stability to the housing during its movement toward and away from the wheel.

* * * * *